(12) United States Patent
Guarnieri et al.

(10) Patent No.: US 8,844,046 B2
(45) Date of Patent: *Sep. 23, 2014

(54) METHOD AND APPARATUS FOR PARALLELING AND DISTRIBUTING STATIC SOURCE CODE SECURITY ANALYSIS USING LOOSE SYNCHRONIZATION

(71) Applicant: International Business Machines Corporation, Armonk, NY (US)

(72) Inventors: Salvatore Guarnieri, Yorktown Heights, NY (US); Marco Pistoia, Yorktown Heights, NY (US); Omer Tripp, Herzelyia (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,049

(22) Filed: Sep. 26, 2012

(65) Prior Publication Data

US 2014/0090065 A1 Mar. 27, 2014

(51) Int. Cl.
*G06F 11/00* (2006.01)
*G06F 21/57* (2013.01)
*H04L 29/06* (2006.01)

(52) U.S. Cl.
CPC ........... *G06F 21/577* (2013.01); *H04L 63/1416* (2013.01)
USPC .......................................................... 726/25

(58) Field of Classification Search
CPC ............ H04L 63/1433; H04L 63/1416; H04L 63/1408; H04L 63/20; G06F 21/577; G06K 9/00228; G06K 9/6231; G06K 9/6256

USPC ...................... 726/17, 25; 716/1, 3, 9, 10, 18; 717/119, 132, 144, 149, 156
See application file for complete search history.

(56) References Cited

U.S. PATENT DOCUMENTS

| 6,782,511 B1* | 8/2004 | Frank et al. ................... 716/102 |
| 7,673,295 B1* | 3/2010 | Lin .............................. 717/156 |
| 2009/0144827 A1* | 6/2009 | Peinado et al. ................. 726/25 |
| 2013/0031531 A1* | 1/2013 | Keynes et al. ................ 717/126 |
| 2013/0031622 A1* | 1/2013 | Berg et al. ....................... 726/17 |

OTHER PUBLICATIONS

Guha, Arjun, et al., "Using Static Analysis for Ajax Intrusion Detection", Apr. 20-24, 2009, International World Wide Web Conference Committee (IW3C2).*
Brumley, David, "Analysis and Defense of Vulnerabilities in Binary Code", Sep. 29, 2008, School of Computer Science, Carnegie Mellon University.*
Wagner, David, "Static Analysis and Computer Security: New Techniques for Software Assurance", Fall 2000, University of California at Berkeley.*

* cited by examiner

*Primary Examiner* — Michael Pyzocha
*Assistant Examiner* — Gregory M Elmore
(74) *Attorney, Agent, or Firm* — F. Chau & Associates, LLC; Anne V. Dougherty, Esq.

(57) ABSTRACT

A method of static source code analysis is provided. A forward search of source code is performed from each of a plurality of source nodes. A backward search of source code is performed from each of a plurality of sink nodes, wherein the forward search and the backward search are performed in parallel simultaneously. The progress of the forward search and the backward search are monitored to determine if the searches intersect at a common node. A vulnerability alert is generated when the monitoring determines that a forward search and a backward search reach a common node.

17 Claims, 2 Drawing Sheets

METHOD AND APPARATUS FOR PARALLELING AND DISTRIBUTING STATIC SOURCE CODE SECURITY ANALYSIS USING LOOSE SYNCHRONIZATION

BACKGROUND

1. Technical Field

The present disclosure relates to information technology, and, more particularly, to source code analysis.

2. Discussion of Related Art

In computer science formal static analysis involves the automatic extraction of information about the possible executions of computer programs. A conventional approach for carrying out static source code security analysis is to model integrity and confidentiality violations as problems as to whether there is a path leading from one node to another in a graph (i.e., graph-reachability problems). In security analysis, the source node represents a statement reading untrusted user input, and the sink node represents a statement executing a security-sensitive operation (e.g., database access), where source vertices are the control locations within the program where untrusted data from the user is read, sink vertices are the locations where security-sensitive operations are performed. There are also locations in the application that are considered "sanitizers", i.e., flows crossing through these locations that are endorsed (i.e., sanitized or validated), either universally or for particular kinds of vulnerabilities, wherein the user input changes status from untrusted to trusted having been checked positively (validated) or modified to contain only legal content (sanitized).

Static source code security analysis holds the promise of finding all vulnerabilities in an application because the analysis simultaneously models all possible execution paths within an application, and more, because of over-approximation.

In practice, it is highly challenging to fulfill this soundness need when applying static security analysis to modern, real-world applications, e.g., web applications whose code base is at the scale of $10^6$ lines of code (LOC), excluding library code.

Applying standard analysis techniques to code of this scale is at best extremely expensive, and, at worst, the analysis crashes before completing the scan. This has led to the several ideas on how to scale the analysis.

A simple and popular solution is to cast bounds on the analysis budget by allowing the analysis to scan only a small neighborhood around each source, ignoring certain libraries or virtual-call resolutions, and constraining the size of the application's call graph. While bounds often yield a scalable analysis, they create several problems. First, the analysis is no longer predictable. A small change in the code may cause the analysis to exceed a bound. Second, and more importantly, bounds are inherently unsound.

Another common solution is to use synthetic models for large libraries, which represent the library's behavior simplistically. This saves the need to scan large amounts of code, but soundness again becomes a concern.

Another approach is modular analysis, where the analysis analyzes each method independently, and produces a general summary of that method. Later, when a client of that method is analyzed, the analysis can reuse the summary without having to reanalyze the method. While elegant and attractive, the modular approach is challenged by several fundamental questions: First, it's not clear how to construct a sound summary for a method manipulating pointer-based data structures. Summaries are valid only under the analysis scope under which they were built. If existing classes are modified or new classes are introduced, previously constructed summaries may have to be invalidated and recomputed, thereby canceling out the advantages of the analysis' being modular. Second, modular summaries are often imprecise due to the need to simultaneously account for all possible behaviors of the summarized method.

As such, there is a need for a method and apparatus for carrying out static source code security analysis in a scalable and efficient manner.

BRIEF SUMMARY

Exemplary embodiments of the present disclosure provide a method and system for parallelizing and distributing static security analysis of source code using loose synchronization. An original source code analysis is broken into multiple independent sub-analyses which are tracked independently and computed periodically.

Multiple independent sub-analyses involve seeds which are starting points for the analysis, namely a statement reading user input for forward analyses from sources and a statement executing a security-sensitive operation for backward analysis starting from sinks. In other words, the multiple independent sub-analyses include: forward tasks which correspond to source seeds, backward tasks which correspond to sink seeds, a chop task which corresponds to a source-sink pair with periodically computed samples, and a witness creation task which corresponds to a source-sink pair.

Solutions (i.e., mappings from each point in the program to the abstract state—per the abstraction employed by the static analysis—at that point) for different seeds can be computed in parallel. Finding whether the intersection between the solutions for a particular source-sink pair is empty (i.e., there is no program point where the abstract states overlap) includes read access into the solution, which evolves monotonically, per the convergence requirements of the framework of abstract interpretation. That is, the abstract states form a lattice, and the solution at each point can only grow during the analysis (per the ordering relation of the lattice). This makes sound parallelization feasible.

Witness creation includes only read access into the corresponding slices (i.e., the part of the program affected by a seed statement (also known as the slicing criterion)) and thus no synchronization is required when such a task is performed.

An algorithm and code may be provided for parallelizing and distributing security analysis for forward task, backward task, chop task, and witness creation task descriptions.

According to an exemplary embodiment a method of static source code analysis is provided. A forward search of source code from each of a plurality of source nodes is performed. A backward search of source code from each of a plurality of sink nodes is performed, wherein the forward search and the backward search are performed in parallel simultaneously. The progress of the forward search and the backward search is monitored to determine if the searches intersect at a common node. A vulnerability alert is generated when the monitoring determines that a forward search and a backward search reach a common node.

The forward search and the backward search may be terminated when the monitoring determines that the searches have reached a common node.

The monitoring may be performed in parallel with the searches.

According to an exemplary embodiment a method for parallelizing and distributing static source code security analysis using loose synchronization includes breaking an original source code analysis into multiple independent sub-analyses that are tracked independently and computed periodically. The multiple independent sub-analyses include a plurality of tasks: forward tasks that correspond to source seeds, backward tasks that correspond to sink seeds, a chop task that corresponds to a source-sink pair with computed periodically samples, and a witness creation task that corresponds to a source-sink pair with queries of partial data-flow graphs.

The method may further include determining whether an intersection between solutions for a particular source-sink pair is empty, wherein finding whether an intersection between solutions for a particular sour-sink pair is empty may include read access into the solution which evolves monotonically per convergence requirements of a framework of abstract interpretation.

Witness creation may include read access into the corresponding slices without synchronization when a witness creation task is performed.

According to an exemplary embodiment a method of static source code analysis includes building a call graph, scanning for sources, sinks and sanitizers, building source tasks and sink tasks, building chop tasks, starting forward propagation and backward propagation, starting chop tasks, and adding results to a report.

According to an exemplary embodiment a method of static source code analysis includes analyzing source code in parallel forward from source nodes, backwards from sink nodes, checking if forward and backwards searches reach same node(s), and producing a vulnerability alert whenever an intersection is detected.

BRIEF DESCRIPTION OF THE SEVERAL
VIEWS OF THE DRAWINGS

Exemplary embodiments will be more clearly understood from the following detailed description taken in conjunction with the accompanying drawings.

DETAILED DESCRIPTION

Figure 1:
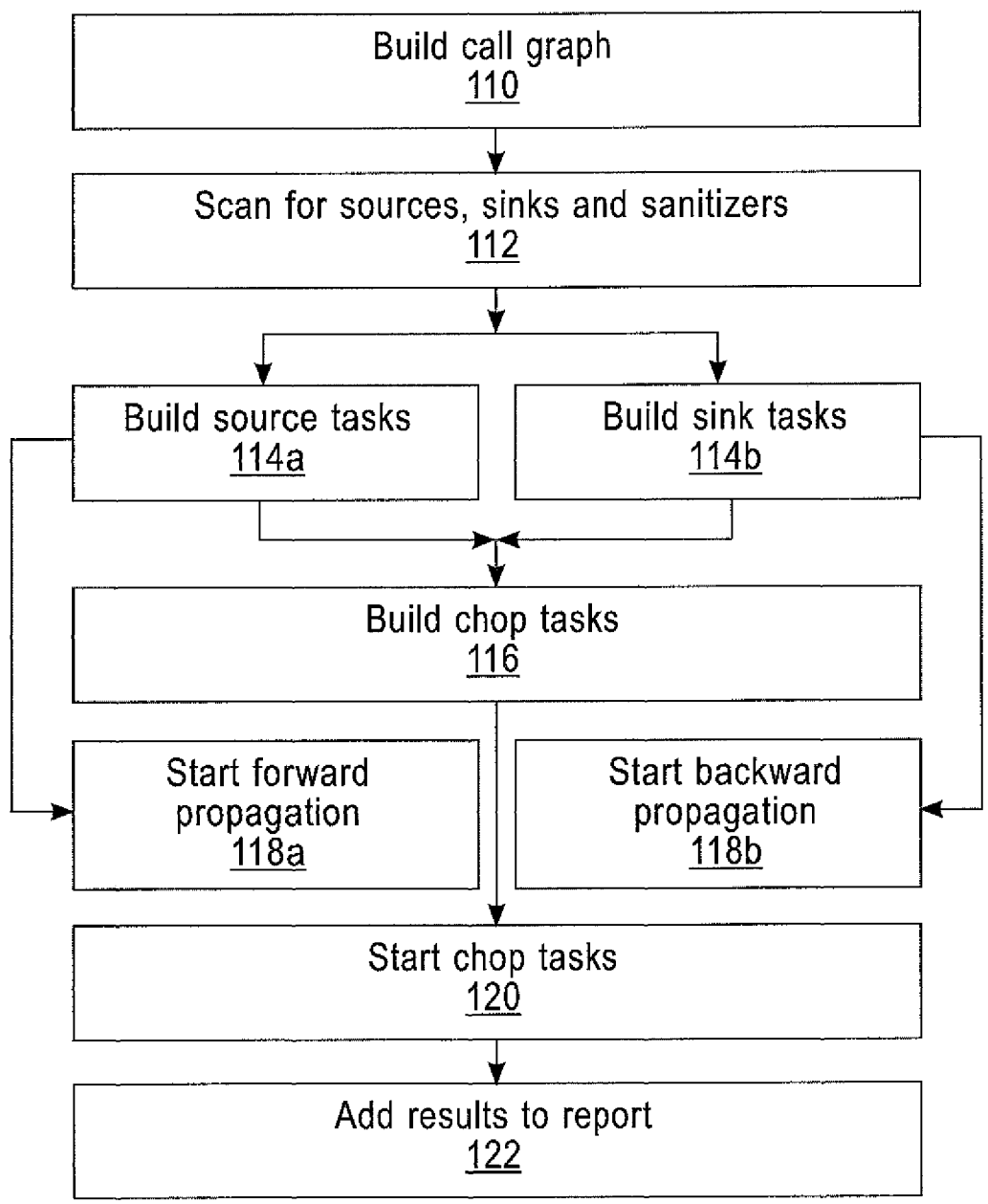
FIG. 1 depicts a sequence of operational steps in accordance with an exemplary embodiment of the present disclosure.

Reference will now be made in more detail to the exemplary embodiments, examples of which are illustrated in the accompanying drawings, wherein like reference numerals refer to the like elements throughout.

In accordance with an exemplary embodiment of the present disclosure an original source code analysis is broken into multiple independent sub-analyses. Each source, or data-flow seed, is tracked independently.

Similarly, flows reaching sink locations are computed backwards independently for each sink, that is, the analysis computes a backward slice for each sink.

The chop, i.e., the intersection between forward flows from sources and backward flows from sinks, is computed periodically, and without synchronization, by reading a current snapshot (i.e., the current (intermediate) solution computed by the analysis) from forward and backward tasks. If the chop of a given source-sink pair is nonempty, then a flow can be recovered for this pair (i.e., a path from the source to the sink can be reconstructed based on their corresponding (partial) slices). This work can also be done in parallel for each source-sink pair.

In accordance with an exemplary embodiment there are four types of tasks: forward tasks, backward tasks, chop tasks, and witness creation tasks.

Forward tasks, which correspond to source seeds, compute (forward) the data flow emanating from a specific source location, which yields a data-flow solution spanning all the locations that are (transitively) reachable (i.e., reachable through zero or more edges) from the source statement.

Backward tasks, which correspond to sink seeds, compute (backwards) the data flow for a given sink location, which yields a solution spanning all the locations that (transitively) reach that sink statement, that is, the solution contains a nontrivial abstract state for all locations that reach the sink statement.

A chop task, which corresponds to a source-sink pair, periodically samples the solutions computed for the source and the sink without any synchronization, and tests whether the sampled data-flow slices intersect. If they do intersect, then (i) the chop task asks the corresponding source and sink tasks to abort, and (ii) a witness creation task is created.

A witness creation task, which corresponds to a source-sink pair, queries the partial data-flow graphs (solutions) for the source and the sink, unifies the two graphs, and then searches for a path extending from the source to the sink. Such a path is found by the chop task, which only creates a witness creation task if the slices intersect.

The decomposition of an implementing algorithm into tasks includes several steps.

First, the solutions for different seeds are computed in parallel. This reduces sharing between the analyses (e.g., Interprocedural Finite Distributive Subset (IFDS)-style memoization), but enables parallelism, and even distribution across a network of independent computers, memoization being the caching of a value so as not to compute it multiple times, with the IFDS dataflow analysis algorithm framework doing this to achieve good asymptotic efficiency.

Second, finding whether the intersection between the solutions for a particular source-sink pair is empty requires read access into the solutions, which evolve monotonically, per the convergence requirements of the framework of abstract interpretation. This implies that no synchronization is required by a chop task, which can run in the background while its corresponding source and sink tasks are executing.

Finally, witness creation also requires only read access into the corresponding slices, and thus no synchronization is required when such a task is performed.

Below is a formal description of an exemplary algorithm, where a forward task is denoted by FW, a backward task by BW, a chop task by C, and a witness task by W, noting that access to shared variables is atomic, so there are no races.

---

Algorithm SecurityAnalysis(Program P, SecuritySpec S)
    Variables:
        FSlices: Seeds −> Slices
        BSlices: Seeds −> Slices
        Status: Slices −> {InProgress,Completed,Aborted}
        CG := CreateCallGraph(P)
        Src := FindSources(CG,S)
        San := FindSanitizers(CG,S)
        Snk := FindSinks(CG,S)
        Foreach src in Src
            Spawn new FW(CG,src,San)
        Foreach snk in Snk
            Spawn new BW(CG,snk,San)
        Foreach <src,snk> in Src x Snk
            If Compatible(src,snk,S)
                Spawn new C(src,snk)

```
FW(CG,src,San)
    Status(FSlices[src]) := InProgress
    While (Status(FSlices[src]) == InProgress)
        R := NextFPropagationStep(CG,src,San,FSlices[src])
        If (R == Done)
            Status(FSlices[src]) == Completed
```

```
BW(CG,snk,San)
    Status(BSlices[snk]) := InProgress
    While (Status(BSlices[snk]) == InProgress)
        R := NextBPropagationStep(CG,snk,San,BSlices[snk])
        If (R == Done)
            Status(BSlices[snk]) == Completed
```

```
C(src,snk)
    While (true)
        Fslice := FSlices[src]
        Bslice := BSlices[snk]
        If (Intersection(Fslice,Bslice) != { })
            Status(Fslice) := Aborted
            Status(Bslice) := Aborted
            CreateWitness(src,snk)
```

```
W CreateWitness(src,snk)
    Let x = Any(Intersection(FSlice,BSlice))
    Let p1 = Any(Paths(src,x) in FSlice)
    Let p2 = Any(Paths(snk,x) in BSlice)
    Output [ p1 , Inverse(p2) ]
```

As an exemplary explanation of the algorithm boxes shown above, consider the witness task W as follows. First, a statement x is found that is contained in the intersection of FSlice (the forward slice from the source, src) and BSlice (the backward slice from the sink, snk). Then a forward path p1 is found leading from src to x, and analogously, and backward path p2 leading from snk to x. The concatenation of p1 is output with the inverse of p2 (since p2 is a backward path), which is a full path from src to snk (going through x).

FIG. 1 shows an overview of a sequence of steps 100 in accordance with an exemplary embodiment of the present disclosure.

In step 110 a call graph is built.

In step 112 a scan is made for sources, sinks and sanitizers.

In step 114*a* and 114*b*, source tasks and sink tasks are built, the task being the execution thread parameterized by a source/sink node, which computes the slice for that node.

In step 116, chop tasks are built.

In step 118*a* and 118*b*, forward propagation and backward propagation are started.

In step 120, chop tasks are started.

In step 122, results are added to a report.

Figure 2:
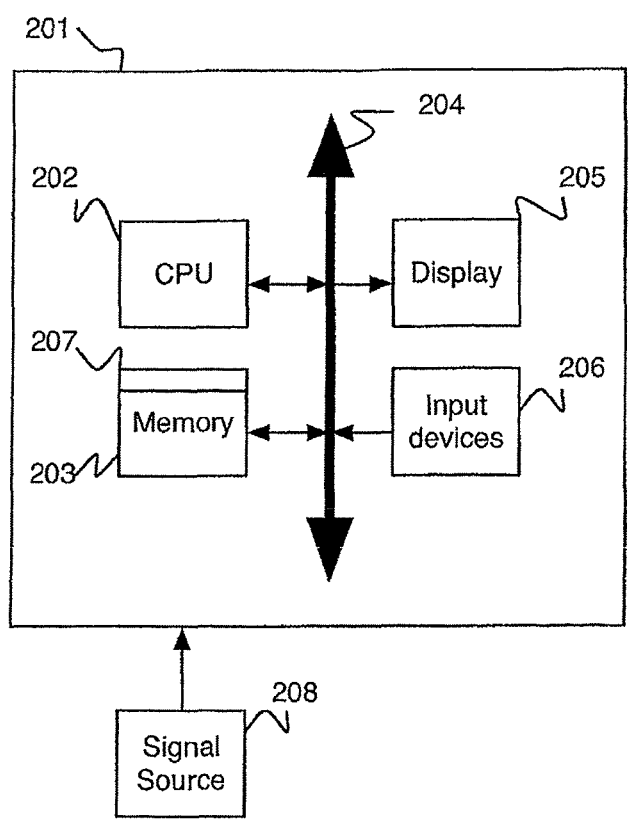
FIG. 2 depicts an exemplary computer system for implementing the exemplary embodiment of the present disclosure as depicted in FIG. 1.

The methodologies of the exemplary embodiments of the present disclosure may be particularly well-suited for use in an electronic device or alternative system. Accordingly, as depicted in FIG. 2, exemplary embodiments may take the form of an embodiment combining software and hardware aspects that may all generally be referred to as a "processor", "circuit," "module" or "system." Furthermore, exemplary implementations may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments are described herein with reference to flowchart illustrations and/or block diagrams. It will be understood that each block of the flowchart illustrations and/or block diagrams, and combinations of blocks in the flowchart illustrations and/or block diagrams, can be implemented by computer program instructions.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For example, FIG. 2 is a block diagram depicting an exemplary computer system for performing the method depicted in FIG. 1. The computer system 201 may include a processor 202, memory 203 coupled to the processor (e.g., via a bus 204 or alternative connection means), as well as input/output (I/O) circuitry 205, 206 operative to interface with the processor 202. The processor 202 may be configured to perform one or more methodologies described in the present disclosure, illustrative embodiments of which are shown in the above figures and described herein. Embodiments of the present disclosure can be implemented as a routine 207 that is stored in memory 203 and executed by the processor 202 to process the signal from the signal source 208. As such, the computer system 201 is a general-purpose computer system that becomes a specific purpose computer system when executing the routine 207 of the present disclosure.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the present disclosure is not limited to those precise embodiments, and that various other changes and modifications may be made therein by one skilled in the art without departing from the scope of the appended claims.

What is claimed is:

1. A method of static source code analysis, the method comprising:
    performing by a computing system a forward search of source code from each of a plurality of source nodes;
    performing by the computing system a backward search of the source code from each of a plurality of sink nodes, wherein the forward search and the backward search are performed in parallel simultaneously;
    monitoring the progress of the forward search and the backward search by the computing system to determine if the forward search and the backward search intersect at a common node;
    generating by the computing system a vulnerability alert when the monitoring determines that the forward search and the backward search reach the common node; and
    combining a result of the forward search and a result of the backward search,
    wherein the combining of the result of the forward search and of the result of the backward search comprises concatenation of the result of the forward search and an inverse of the result of the backward search.

2. The method of claim 1, wherein the forward search and the backward search are terminated by the computing system when the monitoring determines that the forward searches and the backward search have reached a common node.

3. The method of claim 1, wherein the monitoring is performed in parallel with the forward search and the backward search.

4. A method for parallelizing and distributing static source code security analysis using loose synchronization, comprising:
    breaking an original source code analysis into multiple independent sub-analyses that are tracked independently and computed periodically by a computing system, the multiple independent sub-analyses comprising a plurality of tasks comprising:
        forward tasks that correspond to source seeds;
        backward tasks that correspond to sink seeds,
        a chop task that corresponds to a source-sink pair with periodically computed samples, and
        a witness creation task that corresponds to a source-sink pair with queries of partial data-flow graphs; and
    combining a result of the forward tasks and a result of the backward tasks,
    wherein the combining of the result of the forward tasks and of the result of the backward tasks comprises concatenation of the result of the forward tasks and an inverse of the result of the backward tasks.

5. The method of claim 4, wherein solutions for different seeds are computed by the computing system in parallel.

6. The method of claim 4,
    further comprising determining by the computing system whether an intersection between solutions for a particular source-sink pair is empty,
    wherein finding by the computing system whether an intersection between solutions for a particular source-sink pair is empty comprises read access into the solution which evolves monotonically per convergence requirements of a framework of abstract interpretation.

7. The method of claim 4, wherein witness creation comprises read access into the corresponding slices without synchronization when a witness creation task is performed.

8. A method of static source code analysis, the method comprising:
    building a call graph by a computing system;
    scanning for sources, sinks and sanitizers by the computing system;
    building source tasks and sink tasks by the computing system;
    building chop tasks by the computing system;
    starting forward propagation and backward propagation by the computing system;
    starting chop tasks by the computing system;
    combining results of the forward propagation and the backward propagation; and
    adding the combined results to a report by the computing system,
    wherein the combining of the result of the forward propagation and of the result of the backward propagation comprises concatenation of the result of the forward propagation and an inverse of the result of the backward propagation.

9. A method of static source code analysis, the method comprising:
analyzing source code in parallel by a computing system forward from source nodes and backwards from sink nodes;
checking by the computing system if forward searches and backwards searches reach same node(s);
producing by the computing system a vulnerability alert whenever an intersection of the forward searches and backwards searches is detected; and
combining a result of the forward search and a result of the backwards search,
wherein the combining of the result of the forward search and of the result of the backwards search comprises concatenation of the result of the forward search and an inverse of the result of the backwards search.

10. A non-transitory computer program storage device embodying instructions executable by a processor to analyze source code, comprising:
instruction code for performing by a computer system a forward search of source code from each of a plurality of source nodes;
instruction code for performing by the computer system a backward search of the source code from each of a plurality of sink nodes, wherein the forward search and the backward search are performed in parallel simultaneously;
instruction code for monitoring the progress of the forward search and the backward search by the computer system to determine if the forward search and the backward search intersect at a common node;
instruction code for generating by the computer system a vulnerability alert when the monitoring determines that the forward search and the backward search reach the common node; and
instruction code for combining a result of the forward search and a result of the backward search,
wherein the combining of the result of the forward search and of the result of the backward search comprises concatenation of the result of the forward search and an inverse of the result of the backward search.

11. The non-transitory computer program storage device of claim 10, further comprising instruction code for terminating by the computer system the forward search and the backward search when the monitoring determines that the forward searches and the backward search have reached a common node.

12. The non-transitory computer program storage device of claim 10, wherein the monitoring is performed in parallel with the forward search and the backward search.

13. A non-transitory computer program storage device embodying instructions executable by a processor for parallelizing and distributing static source code security analysis using loose synchronization, comprising:
instruction code for breaking an original source code analysis into multiple independent sub-analyses that are tracked independently and computed periodically by a computer system, the multiple independent sub-analyses comprising a plurality of tasks comprising:
forward tasks that correspond to source seeds;
backward tasks that correspond to sink seeds;
a chop task that corresponds to a source-sink pair with periodically computed samples; and
a witness creation task that corresponds to a source-sink pair with queries of partial data-flow graphs; and
instruction code for combining a result of the forward tasks and a result of the backward tasks,
wherein the combining of the result of the forward tasks and of the result of the backward tasks comprises concatenation of the result of the forward search and an inverse of the result of the backwards search.

14. The non-transitory computer program storage device of claim 13, wherein solutions for different seeds are computed by the computer system in parallel.

15. The non-transitory computer program storage device of claim 13,
further comprising instruction code for determining by the computer system whether an intersection between solutions for a particular source-sink pair is empty,
wherein instruction code for finding by the computer system whether an intersection between solutions for a particular source-sink pair is empty comprises instruction code for read access into the solution which evolves monotonically per convergence requirements of a framework of abstract interpretation.

16. The non-transitory computer program storage device of claim 13, wherein witness creation comprises read access into the corresponding slices without synchronization when a witness creation task is performed.

17. A non-transitory computer program storage device embodying instructions executable by a processor to analyze source code comprising:
instruction code executable by the processor for analyzing source code in parallel forward from source nodes and backwards from sink nodes;
instruction code executable by the processor for checking if forward searches and backwards searches reach same node(s);
instruction code executable by the processor for producing a vulnerability alert whenever an intersection of the forward searches and backwards searches is detected; and
instruction code executable by the processor for combining a result of the forward search and a result of the backwards search,
wherein the combining of the result of the forward search and of the result of the backwards search comprises concatenation of the result of the forward search and an inverse of the result of the backwards search.

* * * * *